(12) United States Patent
Carr

(10) Patent No.: US 12,455,190 B2
(45) Date of Patent: Oct. 28, 2025

(54) SPECTROPHOTOMETER COMPRISING PHONONIC MEMS STRUCTURE FOR SENSING ABSORPTIVE FLUID

(71) Applicant: William N. Carr, Gainesville, FL (US)

(72) Inventor: William N. Carr, Gainesville, FL (US)

( * ) Notice: Subject to any disclaimer, the term of this patent is extended or adjusted under 35 U.S.C. 154(b) by 0 days.

(21) Appl. No.: 18/654,968

(22) Filed: May 3, 2024

(65) Prior Publication Data

US 2024/0385037 A1    Nov. 21, 2024

(51) Int. Cl.
*G01J 3/28* (2006.01)
*G01J 3/02* (2006.01)

(52) U.S. Cl.
CPC .......... *G01J 3/0259* (2013.01); *G01J 3/0202* (2013.01); *G01J 3/0286* (2013.01); *G01J 3/2803* (2013.01)

(58) Field of Classification Search
CPC ...... G01J 3/0259; G01J 3/0202; G01J 3/0286; G01J 3/2803; G01J 5/061; G01J 5/08; G01J 5/12; G01N 27/12
See application file for complete search history.

(56) References Cited

U.S. PATENT DOCUMENTS

| | | | |
|---|---|---|---|
| 8,854,624 B2 * | 10/2014 | Pervez | G02B 1/005 356/402 |
| 9,006,857 B1 | 4/2015 | Carr | |
| 9,236,552 B2 | 1/2016 | Carr | |
| 9,722,165 B2 | 8/2017 | Carr | |
| 11,193,904 B2 | 12/2021 | Carr | |
| 11,231,382 B2 | 1/2022 | Carr | |
| 11,300,453 B2 | 4/2022 | Carr | |
| 11,309,473 B2 | 4/2022 | Carr | |
| 11,320,313 B2 | 5/2022 | Kawasaki | |
| 11,381,761 B2 | 7/2022 | Carr | |
| 11,961,988 B1 | 4/2024 | Carr | |
| 2016/0025563 A1 * | 1/2016 | Burgett | G01J 5/0802 250/227.17 |
| 2024/0385037 A1 | 11/2024 | Carr | |

* cited by examiner

*Primary Examiner* — Abdullahi Nur
(74) *Attorney, Agent, or Firm* — Kaplan Breyer Schwarz LLP

(57) ABSTRACT

A spectrophotometer includes a photonic source and a photonic detector, wherein a photonic beam from the photonic source is directed through an absorptive or reflective fluid of interest into a photonic detector. In the illustrative embodiment, the photonic source and the photonic detector are disposed on separate micro-platforms that are formed from the same layer of semiconductor material. The micro-platforms are suspended by nanowires that, in some embodiments, include phononic scattering elements. The phononic scattering elements increase the thermal isolation provided by the nanowires.

21 Claims, 21 Drawing Sheets

SPECTROPHOTOMETER COMPRISING PHONONIC MEMS STRUCTURE FOR SENSING ABSORPTIVE FLUID

FIELD OF THE INVENTION

This invention relates generally to a spectrophotometry, and more particularly to a spectrophotometer having a photonic source and a detector.

BACKGROUND OF THE INVENTION

The field of MEMS devices includes applications across a broad range of technologies including semiconductor integrated circuits including applications based on 3-dimensional structuring. The first semiconductor MEMS device was disclosed by H. Nathanson and R. Wickstrom in U.S. Pat. No. 3,413,573 issued 1968 as a resonant cantilever semiconductor device, wherein an actuated cantilever modulates the transconductance of a MOSFET transistor within an accelerometer device.

More recently, semiconductor apparatuses including phononic structures have been disclosed. See, e.g., U.S. Pat. Nos. 9,006,857; 11,300,453; 11,309,473; 11,381,761; and 11,961,988. The phononic structures are used, for example, to increase the thermal isolation for a suspended microplatform by decreasing the thermal conductivity of nanowires that support the micro-platform.

FIG. 1 is a graph of thermal conductivity for a plurality of reported silicon nanowires, each configured with a phononic crystal for reducing thermal conductivity. (M. Nomura et al, Review of thermal transport in phononic crystals", Materials Today Physics, vol. 22, 00613 (2022).) In FIG. 1, thermal conductivity of the nanowire is plotted as a function of the neck dimension, n, within the nanowire. Phononic nanowires with thermal conductivity approaching 1 watt/mK have been disclosed. This low value of thermal conductivity approaches the level normally associated with a dielectric, and is more than two-orders of magnitude reduced from bulk silicon crystal level.

SUMMARY

Embodiments of the present invention provide a MEMS-based spectrophotometer, and methods therefor. The spectrophotometer includes a photonic source and a photonic detector, wherein a photonic beam emitted from the photonic source is directed through an absorptive or reflective fluid of interest and then towards a photonic detector. In the illustrative embodiment, the photonic source and the photonic detector are disposed on micro-platforms that are formed from the same layer of semiconductor. The fluid of interest comprises a gas or liquid.

Responsivity, R, of the photonic detector in some embodiments of the present application is enhanced by phononic scattering elements that are present in/on nanowires that support a micro-platform on which the photonic detector resides. Using nanowires having such phononic scattering elements, the signal-to-noise ratio for detector operation is increased.

In some embodiments, a metamaterial resonant absorber with a sharp resonance is disposed on a micro-platform of a photonic source. In some embodiments of the present invention, the same metamaterial with a sharp resonance is disposed in a photonic detector, which increases the detectivity at a controlled wavelength and within a limited bandwidth. Based on the Kirchhoff law of thermal radiation, at thermal equilibrium, the emissivity of a material equals its absorptivity. An example of an infrared emitter design without phononic structure based on the Kirchhoff law of thermal radiation is the photonic emitter disclosed in X. Liu et al, Phys. Rev. Letters, vol. 107, 0459 (2011).

FIG. 2 depicts spectrophotometer 201 in accordance with the illustrative embodiment, including its primary operational components, which comprise at least one photonic source 202, at least one photonic detector 203, and surrounding isothermal substrate(s). The photonic beam 205 from the photonic source 202 is partially absorbed or deflected by component species within fluid media of interest 204, and the photonic beam 206 continues towards, and is received by, photonic detector 203.

The photonic source 202 comprises, for example, one or more of a light emitting diode (LED) or a laser, which provide one or more photonic beams having spectral components within the VIS-LWIR wavelength range. The one or more photonic beams are directed through the fluid of interest and then to the photonic detector. The fluid of interest comprises a gas or liquid.

In some embodiments, photonic source 202 is disposed on a micro-platform that is suspended by nanowires having phononic scattering elements (hereinafter "phononic nanowires"). As previously noted, in some embodiments, the photonic detector 203 is disposed on a micro-platform that is suspended by phononic nanowires as well. The phononic nanowires suspend the micro-platforms from an isothermal surrounding substrate.

In some embodiments, the micro-platform is configured to provide increased absorptive sensitivity for spectral components from the photonic source within the VIS-LWIR wavelength range of radiation from the photonic source(s).

The phononic nanowires comprise one or more layers of semiconductor, dielectric, or metallic film, providing one or more of, without limitation, an increase in mechanical strength, an increase in electrical conductivity, static positioning, and electrical isolation. More particularly, phononic nanowires comprise one or more layers of crystalline or polycrystalline semiconductor material. The crystalline or polycrystalline material may be, for example and without limitation, silicon, silicon germanium, germanium, silicon carbide, gallium nitride, vanadium oxide, or complex thermoelectric semiconductors. In some embodiments, the nanowires are comprised of silicon and oxidized in a heated environment after a release step to create the dielectric film on both sides of the nanowire, thereby increasing nanowire mechanical strength and decreasing nanowire thermal conductivity. The one or more layers of a dielectric within the nanowires may be, for example and without limitation, silicon dioxide, aluminum oxide, and silicon nitride.

Furthermore, the phononic nanowires include phononic scattering elements, which may be highly organized in a periodic format, defining a phononic crystal, or, alternatively, randomly arranged. The phononic scattering elements reduce the thermal conductivity of the nanowires, thereby increasing the thermal isolation of the suspended microplatform. In some embodiments, the phononic nanowires comprise one or more sections, each section comprising a phononic crystal or other randomly arranged phononic scattering elements. The discrete phononic scattering elements include one or more of: holes, vias, pillars, surface dots, plugs, cavities, indentations, surface particulates, roughened edges, implanted molecular species, porous structure, and molecular aggregates. As noted above, these phononic scattering elements may be disposed in a periodic format (phononic crystal) or a random format. The distance between phononic scattering elements within the nanowires is less than the mean free path (mfp) of at least some heat-conducting phonons. The phononic nanowires increase the ratio of electrical to thermal conductivity within each nanowire. The phononic nanowires typically have a thickness in the range of about 10 to about 500 nanometers.

The micro-platform and phononic nanowires are disposed within a hermetic cavity. This hermetic cavity is generally maintained at a vacuum level less than 5 milliTorr.

In operation, the signal levels from the detector are processed with a signal analyzer and controller to provide monitoring or identification of one or more components within the fluid of interest.

In some embodiments, a plurality of the micro-platforms including photonic sources are connected in a series/parallel circuit providing a load impedance matched to a selected source of electrical power or providing multiple wavelengths of radiation. In some embodiments, the micro-platform may cool itself via its own blackbody radiation. A steady, internally created signal level is created, wherein the signal level is affected by the temperature of the micro-platform.

In some embodiments, a synchronous detection circuit is used in thermopile applications wherein the photonic source beam is chopped. For resistive bolometer applications, the interrogation current for the bolometer resistor is cycled on and off in successive data acquisition frames.

In some embodiments, a mirror disposed on a surface of the spectrophotometer reflects light that is not directed to the fluid of interest back to the micro-platform, thereby increasing the net respective radiation efficiency or responsivity, R, of the micro-platform.

The micro-platform comprises, without limitation, carbon nanotubes, graphene, silicon black, carbon black, and gold black, providing an increase in emissivity or absorptivity for the photonic source or photonic detector, respectively, according to the Kirchhoff law of thermal radiation. The micro-platforms have dimensions (i.e., length and width) in the range of about 1 to 2000 micrometers.

In various embodiments, the fluid of interest may be exhaust or smokestack effluent, drinking water, breath, blood, urine, or a liquid or gaseous product from a chemical reaction.

In some embodiments, the fluid of interest includes, without limitation, one or more or more of chemical species: $O_2$, $H_2O$, $H_2O_2$, $CH_4$, $BBr_3$, $C_2H_6$, $C_2H_2$, HBr, CO, $CO_2$, $NH_3$, NO, $NO_2$, $C_2H_5OH$, and $CH_2O$. And in some other embodiments, the fluid of interest comprises reflective particulates such as dust and sand. And in yet some additional embodiments, the fluid of interest comprises a molecular species of interest, such as biomedical tissue or material from within a living body.

In some embodiments, the spectrophotometer is configured as an oximeter sensitive to the oxygen content of blood. In some other embodiments, the spectrophotometer is configured to monitor the glucose content of blood.

DETAILED DESCRIPTION

Definitions. The following terms are explicitly defined for use in this disclosure and the appended claims:

"LED" means a semiconductor device which radiates light within the spectral visible/near-infrared range when a pn junction is forward biased.

"LEP" means a resistive semiconductor light emitting platform which radiates blackbody light with maximum intensity within the infrared spectral range.

"Blackbody light" means radiation from a surface based on the Phelan-Boltzmann radiation equation where radiated intensity is proportional surface temperature temperature $T^4$.

"Responsivity (R)" means the ratio of the detector response signal amplitude divided by the absorbed photonic beam power.

"VIS-LWIR" refers to a light beam with wavelength components within the visible to long-wavelength infrared range.

Figure 1:
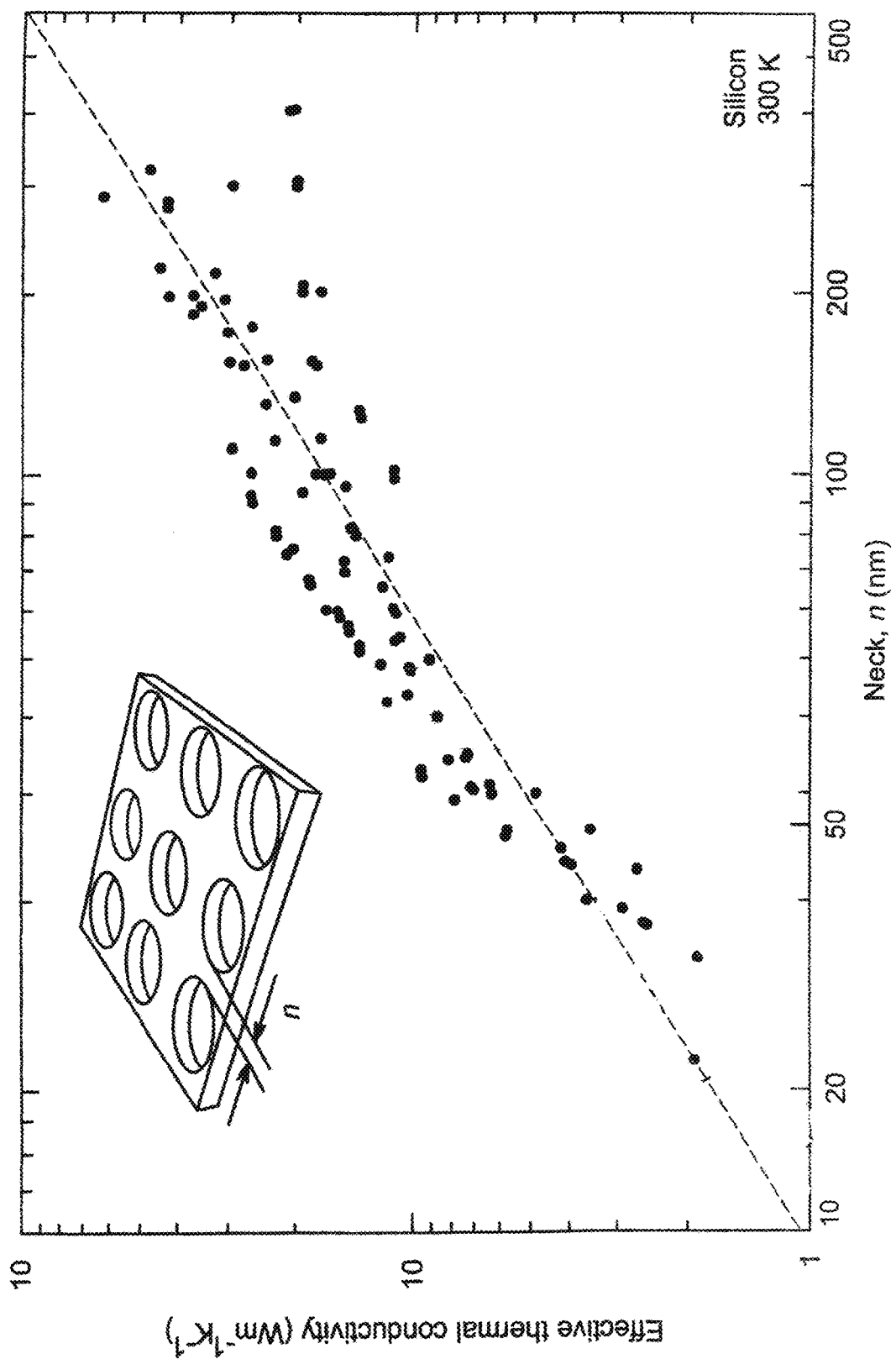
FIG. 1 is a graph of nanowire thermal conductivity plotted versus a dimension of phononic crystal structure (prior art).
Figure 2:
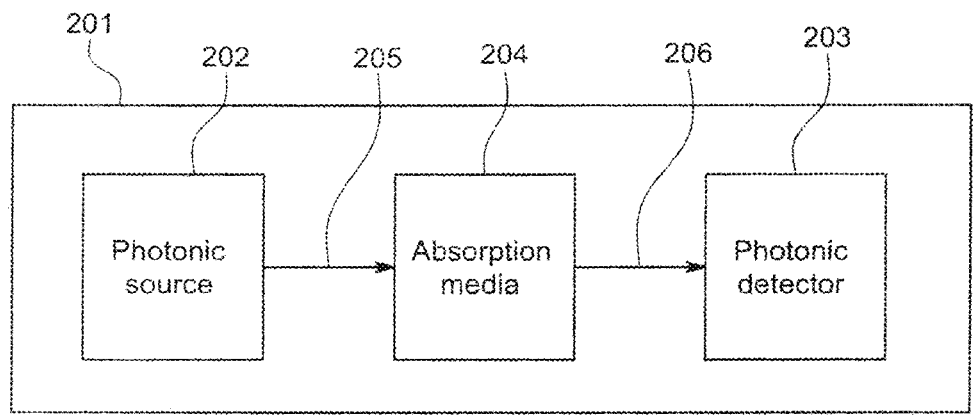
FIG. 2 is a block diagram of the photonic source, directed photonic beam, and photonic detector within the spectrophotometer, in a relevant environment.
Figure 3A:
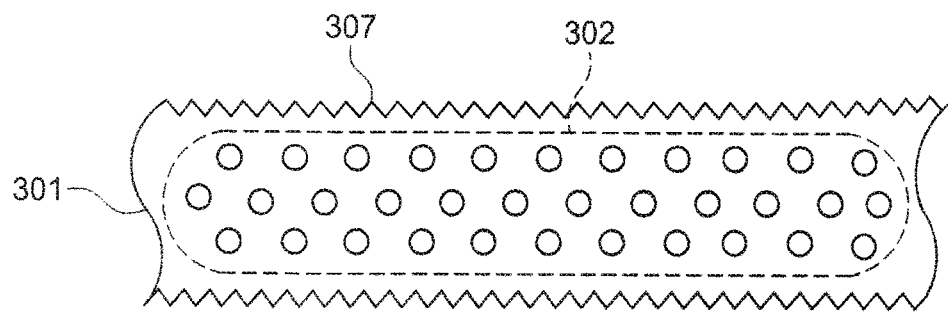
FIGS. 3A-3D depicts plan views of embodiments of phononic nanowires.

FIGS. 3A-3D depict plan views of an embodiment of a portion of phononic nanowire 301, the nanowire having a flat form factor and including phononic scattering elements. The phononic scattering elements reduce the thermal conductivity of the nanowires by scattering phonons. FIG. 3A depicts an embodiment of nanowire 301 comprising phononic crystal 302, which is a regular array of holes that extend through the nanowire. In the embodiment of FIG. 3A, the edges of nanowire 301 includes additional phononic scattering elements in the form of serrated edges 307. Like phononic crystal 302, serrated edges 307 contribute to a reduction in thermal conductivity along the nanowire.

Figure 3B:
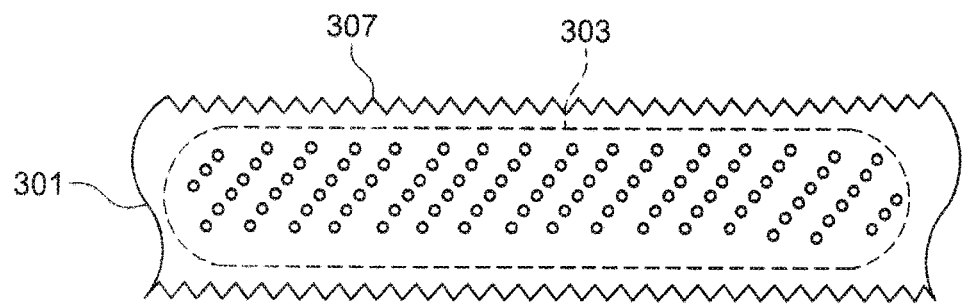

FIG. 3B depicts an embodiment of phononic nanowire 301 wherein phononic crystal 303 includes an ordered arrangement of holes that are oriented at an angle with respect to overall phononic thermal transport vector. This embodiment of a phononic crystal reduces thermal conductivity further relative to the arrangement depicted in FIG. 3A.

Figure 3C:
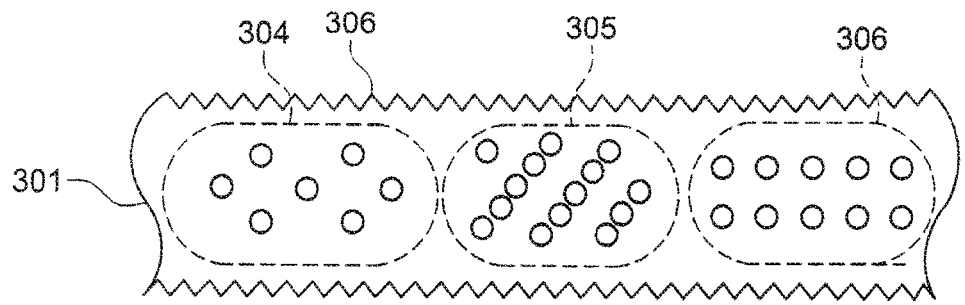

FIG. 3C depicts an embodiment wherein phononic nanowire 301 includes multiple groups of phononic crystals 304, 305, and 306 disposed along the length of the nanowire.

Figure 3D:
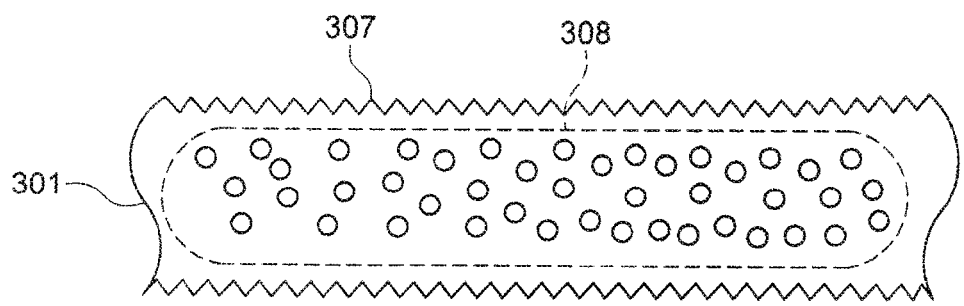

FIG. 3D depicts an embodiment of a portion of a phononic nanowire 301 having phononic scattering elements 308, which are a plurality holes that are disposed in a random manner. Note that in a phononic crystal, the phononic scattering elements adopt a highly organized arrangement. Thus, it is not appropriate to characterize the plurality of randomly arranged phononic scattering elements 308 as a phononic crystal.

Other embodiments of phononic scattering elements may include any of a number of other shapes/structures/arrangements in the nanowire bulk and/or nanowire surfaces that are capable of scattering phonons, including, without limitation, appropriately spaced pillars, surface dots, plugs, cavities, indentations, surface particulates, roughened edges, implanted molecular species, porous structure, and molecular aggregates, disposed in a periodic or random format. All these nano-scale elements scatter phonons along the length of the nanowires, and thereby reduce the thermal conductivity of the nanowire.

Figure 4A:
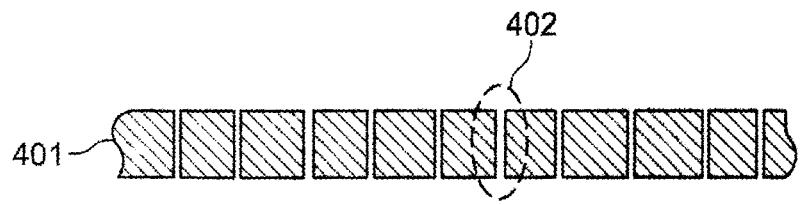
FIGS. 4A, 4B, 4C depict cross-sectional views of embodiments of phononic nanowires.

FIGS. 4A, 4B, 4C and 5 depict cross-sectional views of embodiments of phononic nanowire 401, wherein each nanowire includes phononic crystal 402. FIG. 4A depicts an embodiment in which phononic nanowire 401 has a single level of semiconductor. Such an embodiment is suitable for embodiments of phononic nanowire 301 depicted in FIGS. 3A-3D. In some embodiments, the semiconductor is silicon crystal.

Figure 4B:
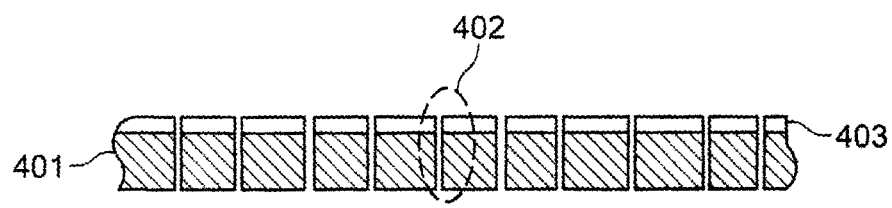
Figure 4C:
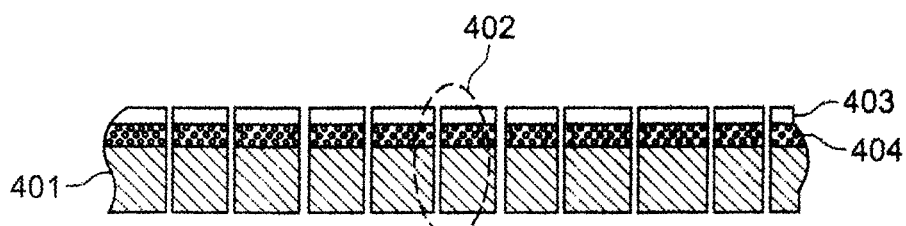

FIG. 4B depicts an embodiment of nanowire 401 in which metal film 403 is disposed on one surface of the semiconductor. FIG. 4C depicts an embodiment of nanowire 401 wherein dielectric film 404 covers a surface of the nanowire 401, and metal 403 covers the dielectric film.

Figure 5:
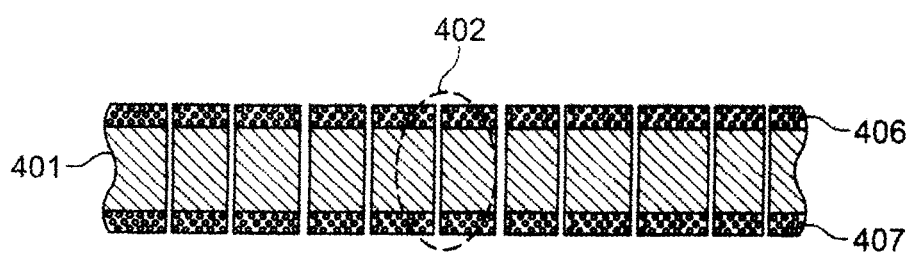
FIG. 5 depicts a cross-sectional view of a phononic nanowire with a dielectric film on both major surfaces thereof.

FIG. 5 depicts an embodiment of phononic nanowire 401, wherein dielectric films 406, 407 are disposed on both major surfaces of nanowire 401. In some embodiments, the dielectric films provide increased rigidity and, in some cases, static positioning of the nanowire.

Figure 6:
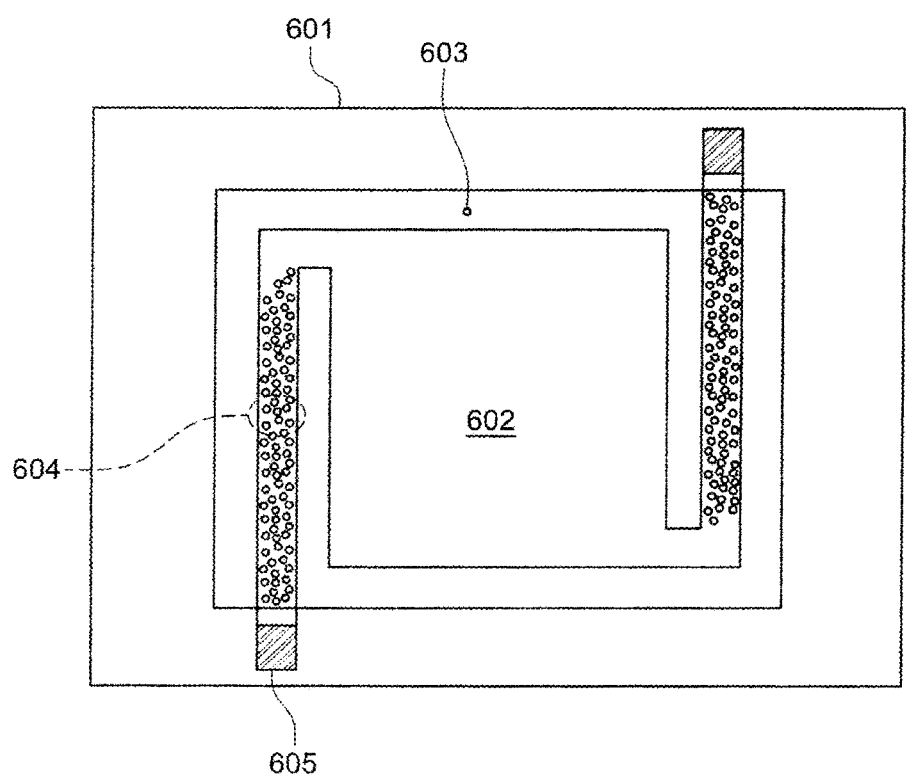
FIG. 6 depicts a plan view of a micro-platform supported by two nanowires.

FIG. 6 depicts a plan view of a micro-platform 602 supported by two nanowires 604, wherein the nanowires are suspended from surrounding platform 601 at bonding pads 605. The nanowires are illustrated with randomly disposed phononic scattering elements.

Figure 7:
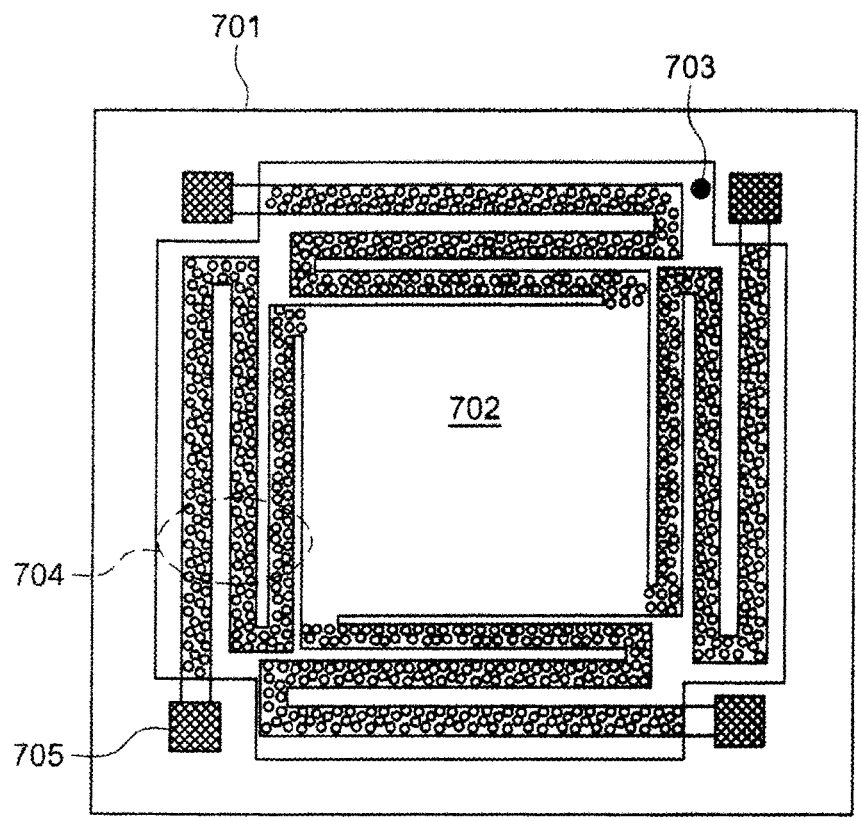
FIG. 7 depicts a plan view of a micro-platform supported by four nanowires.

FIG. 7 depicts a plan view of a micro-platform 702 supported by four nanowires 704, the latter suspended from bonding pads 705 disposed on surrounding platform 701. The nanowires are depicted in an extended form that increases thermal isolation of the micro-platform 702.

Figure 8:
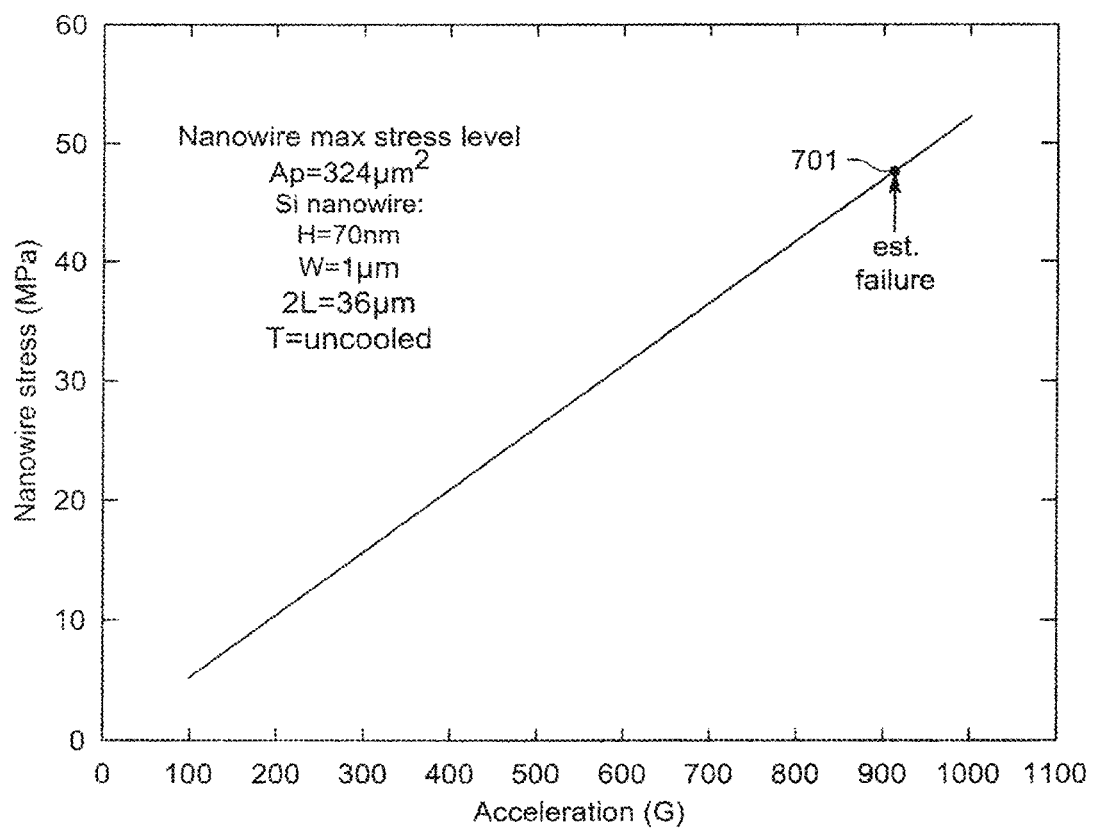
FIG. 8 is a graph of nanowire stress as a function of pixel acceleration with a specific vector direction.

FIG. 8 is a graph of nanowire stress as a function of pixel shock acceleration with a specific vector direction simulated with COMSOL. The referenced pixel in this example graph is a crystalline silicon micro-platform of area $A_p=324$ um$^2$ supported from two nanowires, each with length L=18 um. Acceleration at 900G reaches the 47 MPa stress limit 701 for silicon.

Spontaneous Cooling of the Thermally Isolated Micro-Platform.

Figure 9:
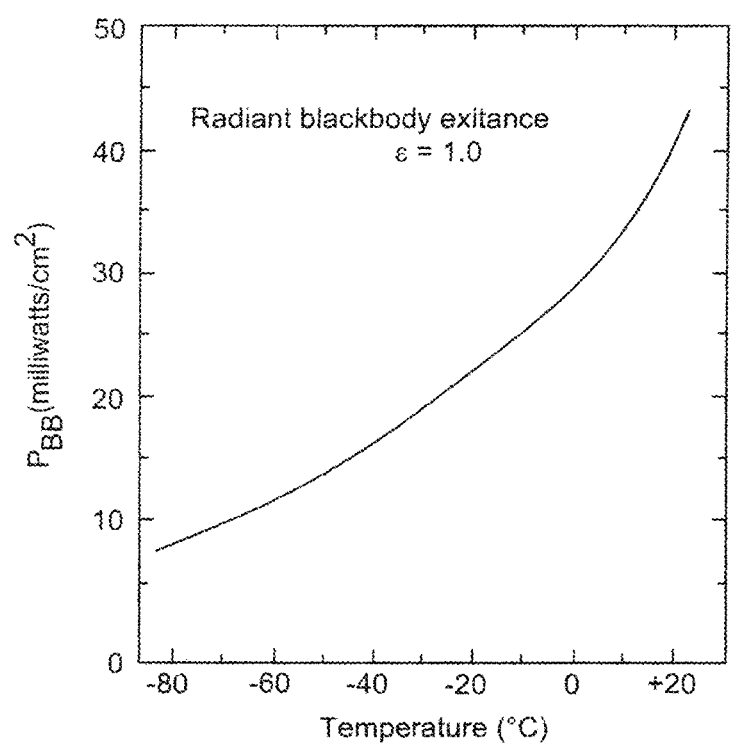
FIG. 9 is a graph of blackbody radiated power as a function of surface temperature.

FIG. 9 is a graph of blackbody radiated power density $P_{BB}$ as a function of surface temperature T from a surface having high emissivity (E=1). At 20° C., a surface of high emissivity radiates 42 mW/cm$^2$ integrated over all wavelengths. Peak radiation intensity at room temperature is at a wavelength of 10 um. Assuming all of this blackbody radiation cools the surface, and nominal heat is received from surroundings including the nanowires, the surface is cooled up to 42 mW/cm$^2$. This cooling power can cool a micro-platform with micrometer dimensions by multiple tens of degrees Centigrade.

Figure 10:
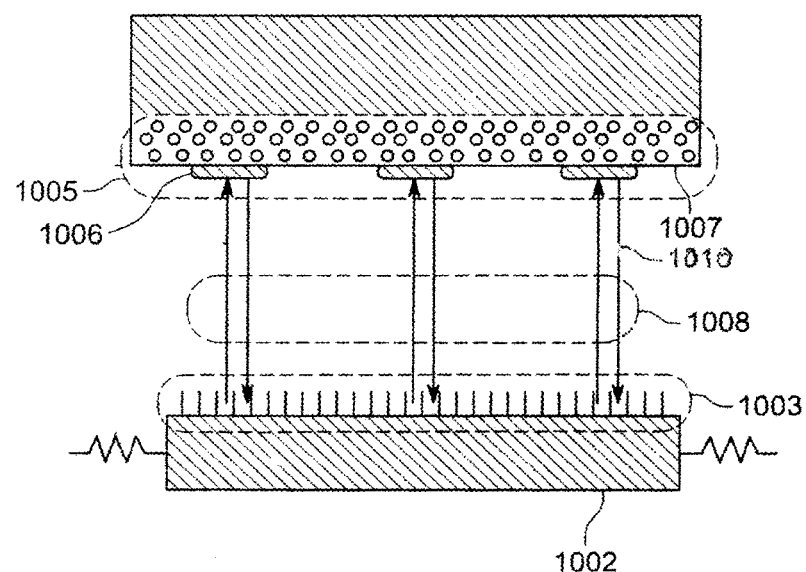
FIG. 10 is a cross-sectional view depicting blackbody radiation from a micro-platform and an exposed structured cavity surface.

FIG. 10 is a cross-sectional view depicting a portion of a phononic pixel (micro-platform and phononic nanowires) with internal spontaneous blackbody radiation components 1008 originating from both the micro-platform 1002 and the surrounding hermetic cavity wall 1005 affecting the platform temperature within the pixel. Blackbody radiation 1008 from the micro-platform and the surrounding cavity wall cool and heat the micro-platform, respectively. When blackbody radiation from the micro-platform exceeds the radiation level from the cavity walls, the micro-platform may spontaneously cool itself. This pixel view without the incident photonic beam is provided as an illustration of the mechanism for spontaneous cooling of the micro-platform.

In some embodiments, blackbody radiation from the exposed cavity surface is reduced by resonant metamaterial structure 1003, such as carbon nanotubes. Within each pixel, a micro-platform is supported by nanowires within a cavity.

Synchronous Circuit Configuration for Unwanted-Signal Reduction.

Figure 11A:
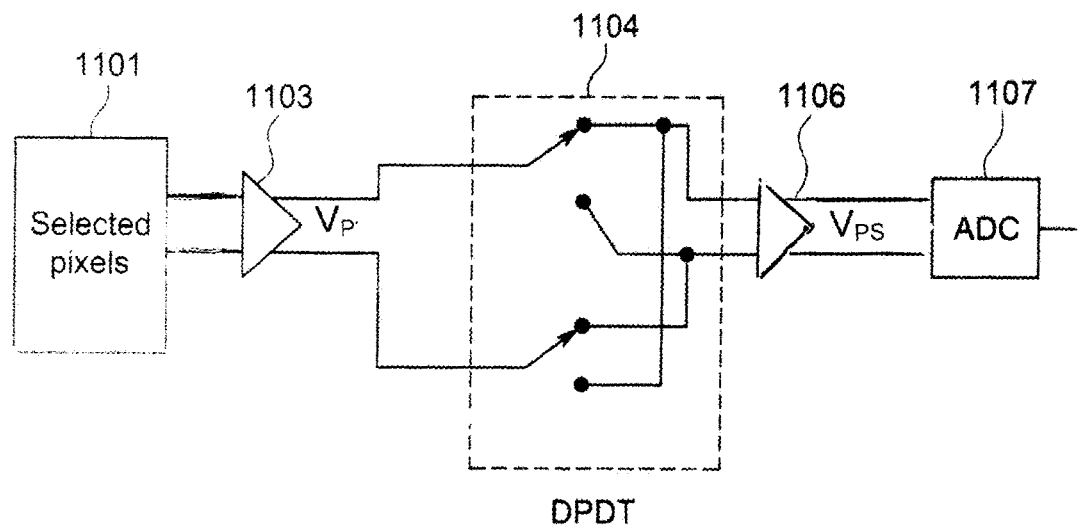
FIG. 11A, 11B depict a synchronous switch and waveforms for separating the steady pixel signal from the photonic beam signal.
Figure 11B:
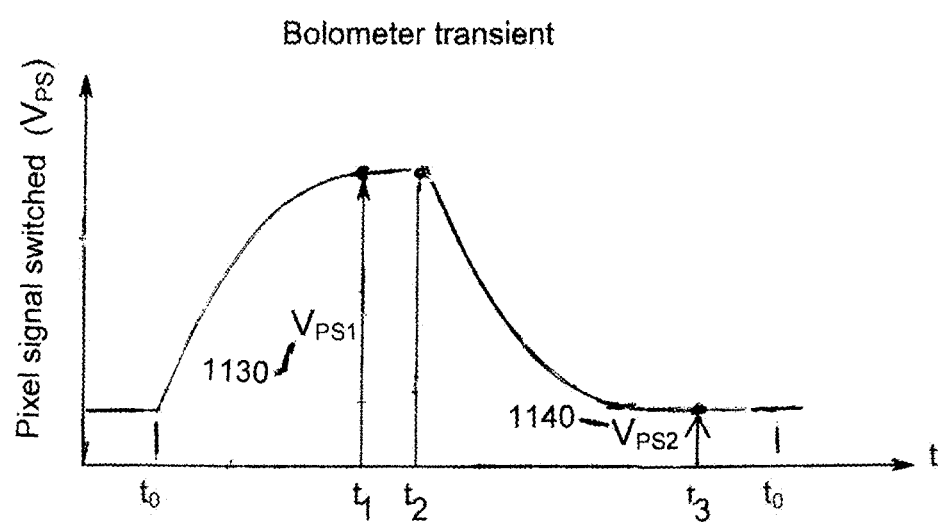

FIGS. 11A and 11B depict a synchronous switch for use in some embodiments of the invention. The synchronous switch is sequenced by a signal analyzer and controller (not depicted). In this embodiment, the synchronous switch configuration of FIG. 11A separates a first photonic beam signal. This is accomplished by sampling a transient pixel signal $V_{P1}$ at two different times $t_1$ and $t_3$, defined in FIG. 11B. The transient signal level is characterized by a time constant $\tau_p$ determined by the thermal time response of the micro-platform and its supporting nanowires.

The external signal analyzer and control circuit implements the reading of a first digital signal obtained from the ADC 1107 by selecting pixel 1101, buffering the detector signal through op amp 1103, and connected into op amp 1106 through DPDT switch 1104. This first digital signal from ADC is determined during sampling at time $t_1$. This first signal 1105 is the signal sum resulting from (1) any spontaneous cooling of the micro-platform 1101, (2) platform incident signal level enhanced due to interrogation current or diode switching, and (3) random circuit noise.

The external signal analyzer and control circuit obtains a second digital signal buffered through the same path through the DPST switch 1104 into ADC 1107. This second signal sampled at time $t_3$ is obtained without any signal component from the photonic beam within the spectrophotometer. The difference in signal levels monitored at $t_1$ and $t_3$ by signal analyzer circuitry and is a measure of the intensity of photonic signal of interest received into the pixel detector.

The synchronous switching circuit is useful with a resistive bolometer wherein the photonic beam sensitivity is repetitively enabling/disabling the interrogation current through the thermistor of the bolometer. The synchronous switching circuit is useful with a pyroelectric sensor or photodiode wherein the photon beam is repetitively chopped.

Photonic Source and Photonic Detector Configurations.

Figure 12A:
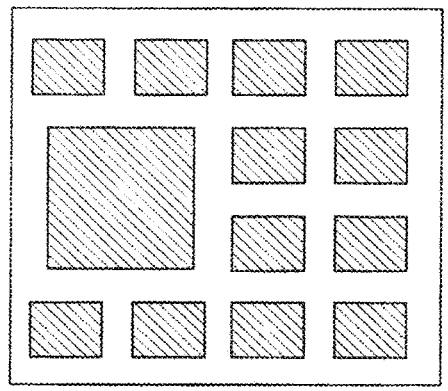
FIGS. 12A-12D depict thin film resonant metamaterial structures disposed on a portion of a micro-platform.
Figure 12B:
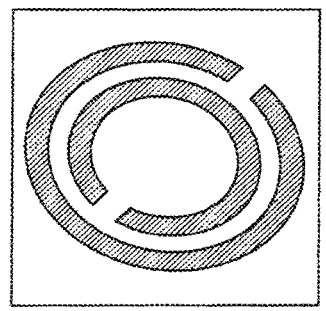
Figure 12C:
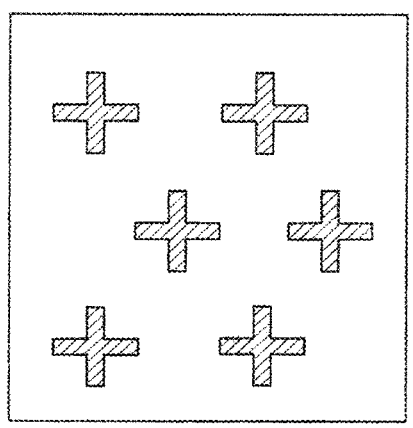
Figure 12D:
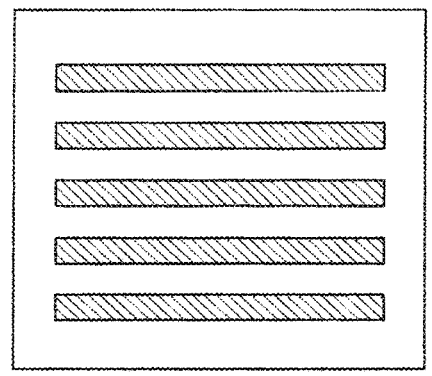

FIGS. 12A-12D depict various embodiments of thin-film, resonant, metamaterial structures disposed on a micro-platform. When these structures are created on the micro-platform, the spectral bandwidth of photonic radiation is reduced. In the embodiment of FIG. 12A, there are two separate spectral wavelength bands corresponding to two different area plasmonic resonators.

Figure 13:
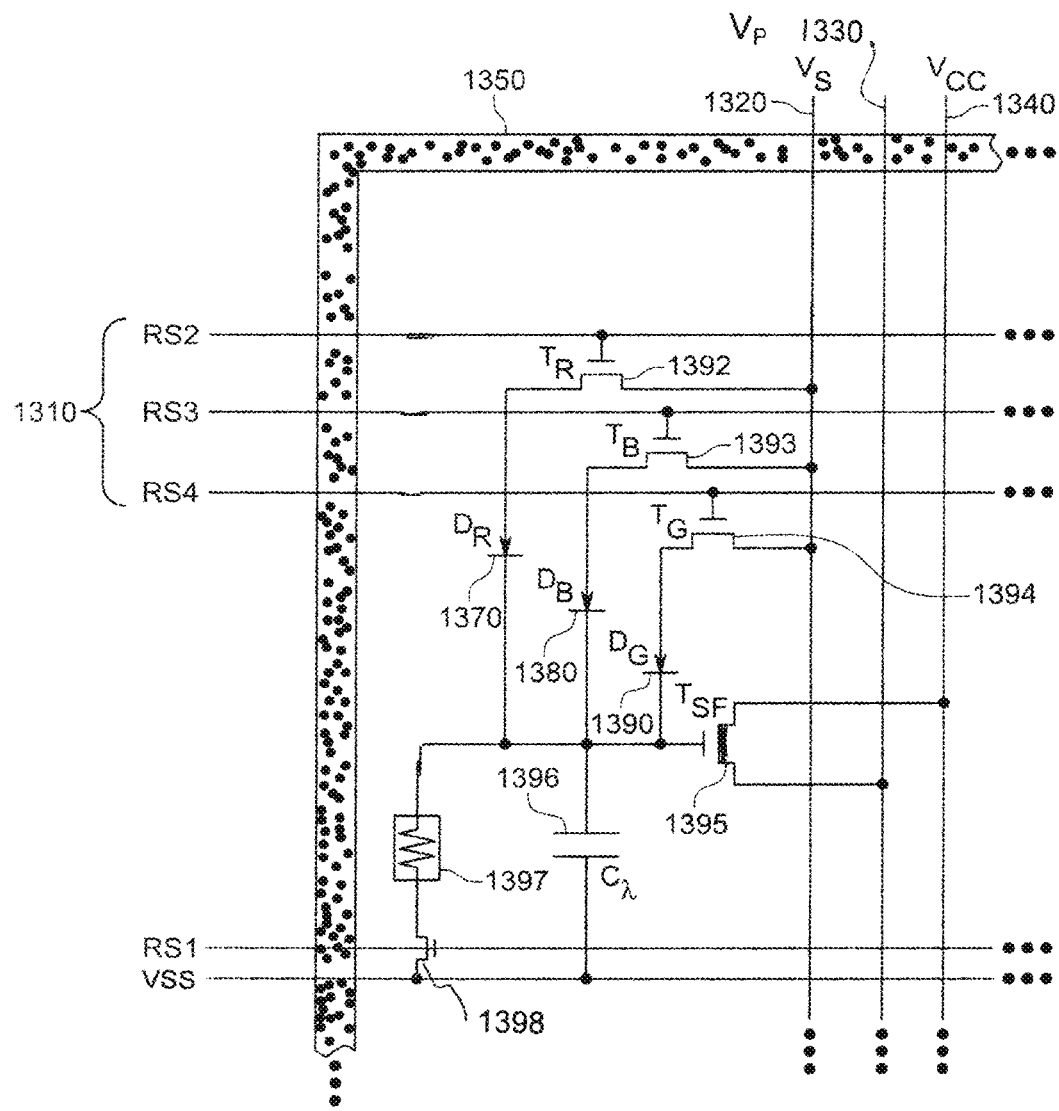
FIG. 13 depicts a detector pixel circuit with hyperspectral detectivity.

FIG. 13 depicts a detector pixel circuit providing hyperspectral detectivity. The signal analyzer and controller monitor the pixel through separate time intervals providing a monitoring or identification of a component within the fluid of interest. This embodiment comprises three RGB photodiodes providing visible VIS sensitivity, and a micro-platform 1397 providing MWIR sensitivity. In some embodiments, RGB photodiodes are disposed directly in or on the surrounding semiconductor substrate. Power supply line VCC 1340 is generally enabled at all times during pixel readout time sequencing.

All transistors are MOS enhancement-mode type except transistor TSF 1395, which is operated in a saturation-mode to permit processing of the thermal signal level from microplatform 1397, which is much lower amplitude compared with the RGB diode signal levels. Micro-platform 1397 is formed with phononic nanowires.

During a time interval 1, the three RGB diodes red $D_R$ 1370, blue $D_B$ 1380 and green $D_G$ 1390 are biased negatively. This is accomplished with VS 1320 set to a negative value with lines RS1, RS2, RS3, RS4 set high, enabling transistors $T_R$ 1392, $T_B$ 1393, and $T_B$1394.

During time interval 2, the three RBG diodes are open circuited by RS1, RS2, RS3, RS4 set low, permitting the RBG diodes to float electrically. During this interval, the diodes are exposed to the photonic beam from the fluid of interest and the diode voltage is lowered by charge recombination in each diode.

Next, the voltage on the photodiodes RGB is readout during separate time intervals 3, 4, 5. Levels RS2, RS3, RS4 are enabled during separate time intervals. RS1 is set to zero, disabling transistor 1398. Readout is accomplished by readout of voltage from capacitor CA through analog source follower TSF 1395 into pixel signal line $V_P$ 1330.

In FIG. 13, signal readout of temperature of microplatform 1397 is obtained during time intervals 6 and 7, wherein voltage is sampled at respective times $t_1$ and $t_3$, based on the method disclosed with FIG. 11A. Signal readout is provided into line VP 1330 through source follower transistor TSF 1395.

Figure 14A:
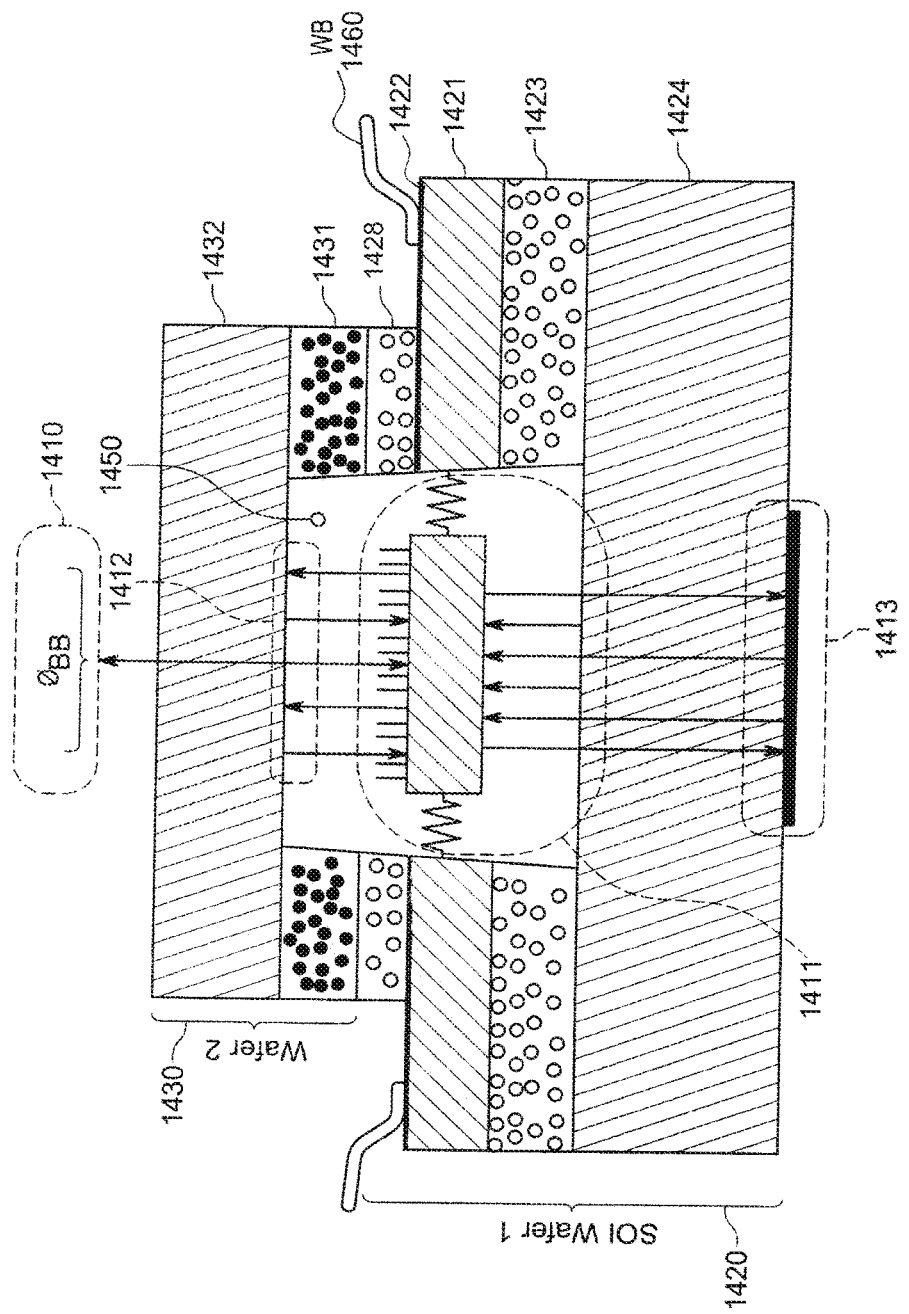
FIG. 14A is a cross-sectional view depicting a micro-platform with a nanotube absorber and with a wire-bonded interpixel connection.

FIG. 14A is a cross-sectional view depicting a phononic pixel configured with a micro-platform 1411 with a nanotube absorber disposed within hermetic cavity 1450. The pixel is illustrated with a wire bonded WB connection 1460 to metallization 1422. The pixel in this embodiment can be operated either as a photonic source or a photonic detector. The platform can be operated as an LEP providing radiation $\phi_{BB}$ when the micro-platform is heated to a higher temperature, or operated as a detector when the photonic beam is absorbed into the platform.

In FIG. 14A, a reflecting mirror 1413 provides an increase in photometric response for the micro-platform. Reflected light and black body radiation from cavity wall 1412 is indicated. The micro-platform and nanowires 1411 are formed from layer 1421 within wafer 1420. In this embodiment, wafer 1420 is a silicon-on-insulator ("SOI") wafer. Layers 1424, 1423, 1421 of the wafer comprise, respectively, semiconductor substrate, dielectric film, and (active) semiconductor (for forming the micro-platform and nanowires), respectively. External connection to the pixel is provided through connection SB 1460 through metal film 1422. In this embodiment, wafer2 1430 with substrate 1432 is bonded to the processed wafer1 with metal seal 1431, dielectric seal 1428 and electrically isolated with dielectric layer 1423. Carbon nanotubes are depicted as part of the micro-platform. In some embodiments, mirror 1413 reflects "stray" light back into micro-platform 1411, increasing photonic net radiation from the micro-platform or photonic absorption into the detector. respectively. The micro-platform and nanowires 1411 are contained within hermetic cavity 1450.

Figure 14B:
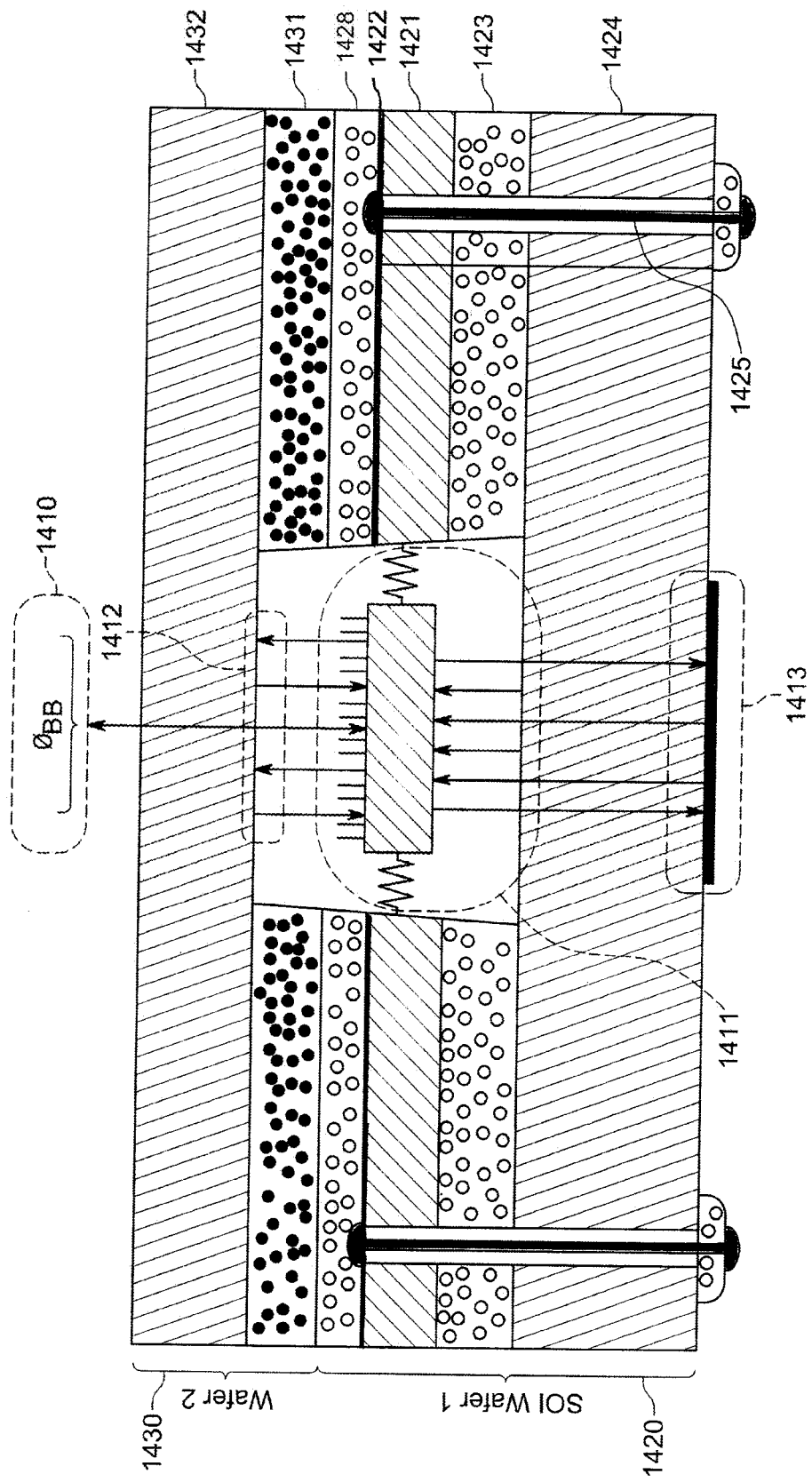
FIG. 14B is a cross-sectional view depicting a micro-platform with a nanotube absorber and with a through-silicon-via (TSV) interpixel connection.

FIG. 14B is a cross-sectional view depicting a microplatform 1411 with a nanotube absorber and a through-silicon-via (TSV) interpixel connection. This embodiment is similar to the embodiment of FIG. 14A, except that through-semiconductor-vias (TSV) connections 1425 from the pixel (or a pixel array) are provided instead of the wire bonds WB 1460. The pixel is fabricated from a starting semiconductor wafer 1420 wherein the micro-platform and nanowires are created. A final step in the fabrication process of the FIG. 14B embodiment is to bond wafer2 to wafer1 creating the hermetic cavity surrounding the platform and nanowires 1411. In some embodiments, the wafers are silicon and both substrates comprise float-zone silicon.

Figure 15:
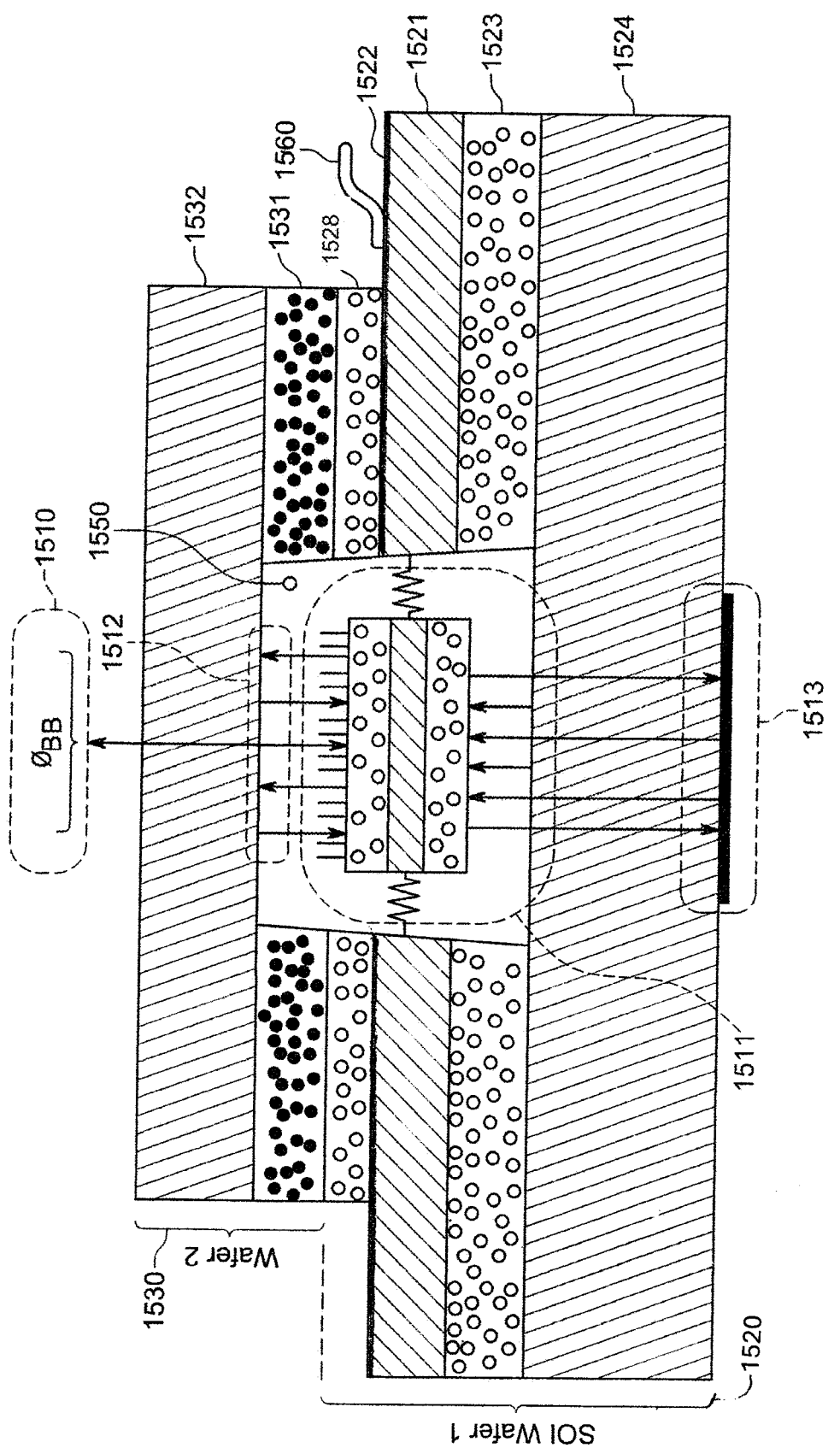
FIG. 15 is a cross-sectional view depicting a micro-platform with a nanotube absorber and diffused dielectric layers.

FIG. 15 is a cross-sectional depiction of a silicon pixel wherein the micro-platform and nanowires 1511 are formed with a grown oxide film on both sides of the micro-platform. The grown oxide film is $SiO_2$, which provides more mechanical strength than silicon. The thermal conductivity of the silicon nanowire is reduced, increasing thermal isolation for the micro-platform.

The structure of the FIG. 15 is similar to that of FIG. 14A, wherein connection to an individual pixel or an array of pixels is obtained with a wire bond 1560 to internal connecting metal film 1522.

The starting micro-platform and supporting nanowires 1511 are fabricated from wafer1. In the illustrative embodiment, Wafer1 1520 is an SOI wafer comprising active silicon layer 1521, buried oxide layer 1523, and substrate 1524. Wafer2 1530 is bonded to processed wafer1 1520 with metallic seal 1531. The micro-platform and nanowires are suspended within hermetic cavity 1550.

Figure 16:
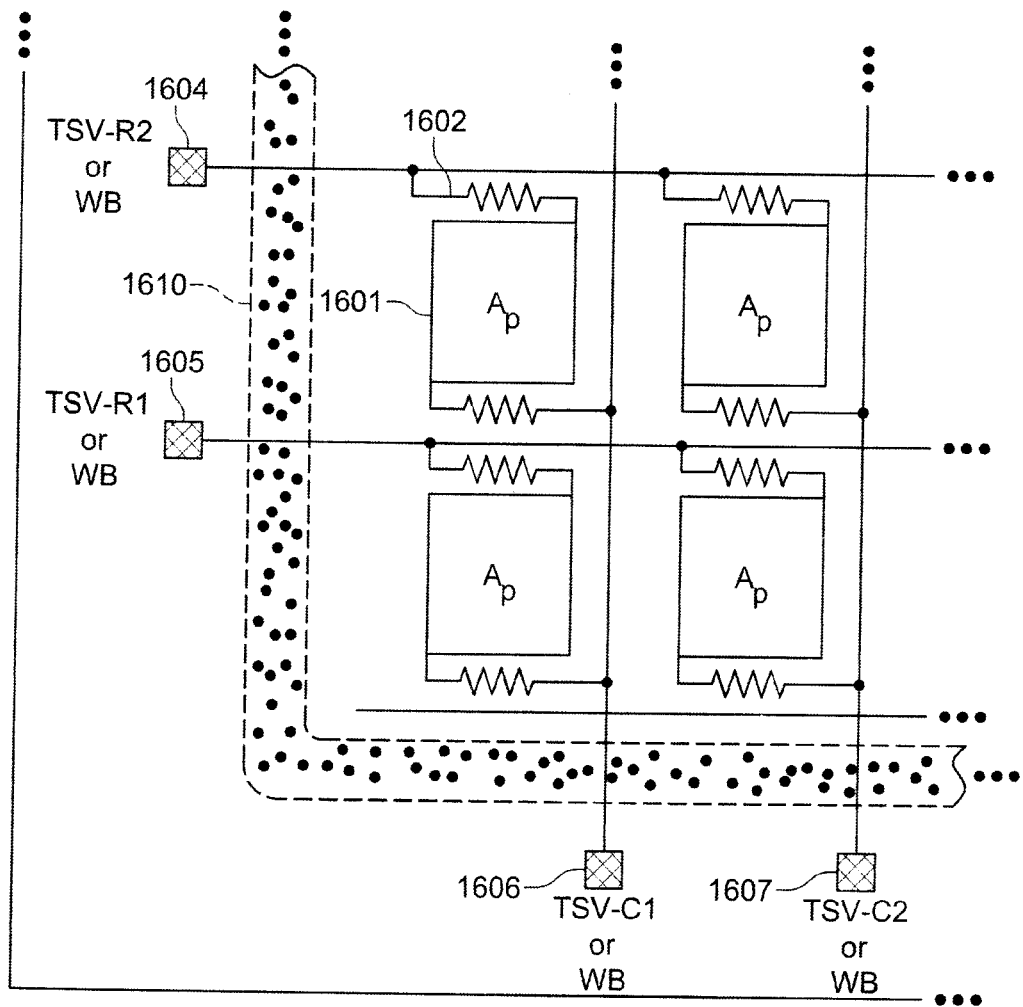
FIG. 16 is a plan view depicting an array of four interconnected phononic MEMS pixels.

FIG. 16 is a plan view depicting an array of four interconnected phononic pixels 1601 with TSV connections 1604-1607 created on a surrounding substrate. Hermetic seal 1610 surrounds the array. These pixels may comprise the photonic source or the photonic detector, and include phononic nanowires 1602. In this example, individual pixels may be addressed through the TSV connection around the periphery of the pixel array. In some other arrayed applications, pixels may be interconnected within a series/parallel combination circuit.

Figure 17:
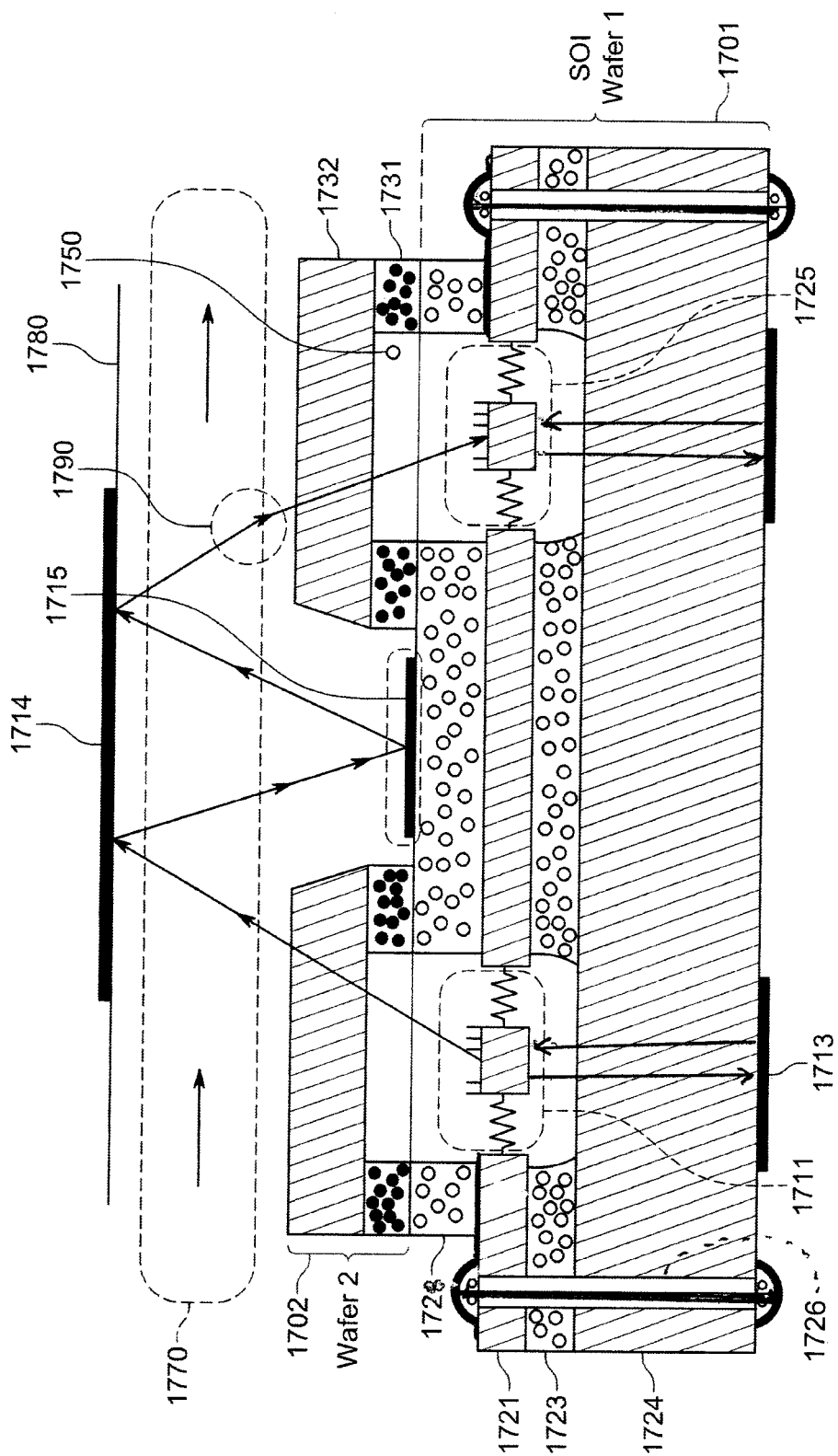
FIG. 17 is a cross-sectional view depicting the spectrophotometer comprising two phononic pixels sharing a single substrate.

FIG. 17 is a cross-sectional view depicting the spectrophotometer with the photonic source 1711 and the photonic detector 1725, each on a micro-platform supported by phononic nanowires. In this embodiment, the photonic source and photonic detector pixels share a common substrate (i.e., layer 1721 of wafer1 1701). The fluid of interest 1770 fills a space between mirrors 1714 on external surface 1780 of the spectrophotometer and mirror 1715 disposed on dielectric film 1728 above wafer1. The photonic source and photonic detector are connected to through-semiconductor-vias TSV 1726 within wafer1. Mirrors 1713 disposed on substrate 1724 reflect light back into the micro-platforms increasing power efficiency and sensitivity for the photonic source 1711 and detector 1725, respectively.

Wafer1 1701 (with added dielectric film 1728) includes active semiconductor layer 1721 and dielectric layer 1723 over surrounding substrate 1724. After processing (e.g., platform and nanowire release step, etc.), wafer1 is bonded to wafer2 1702. Bonding material 1731 is used to form hermetic cavity 1750.

Figure 18:
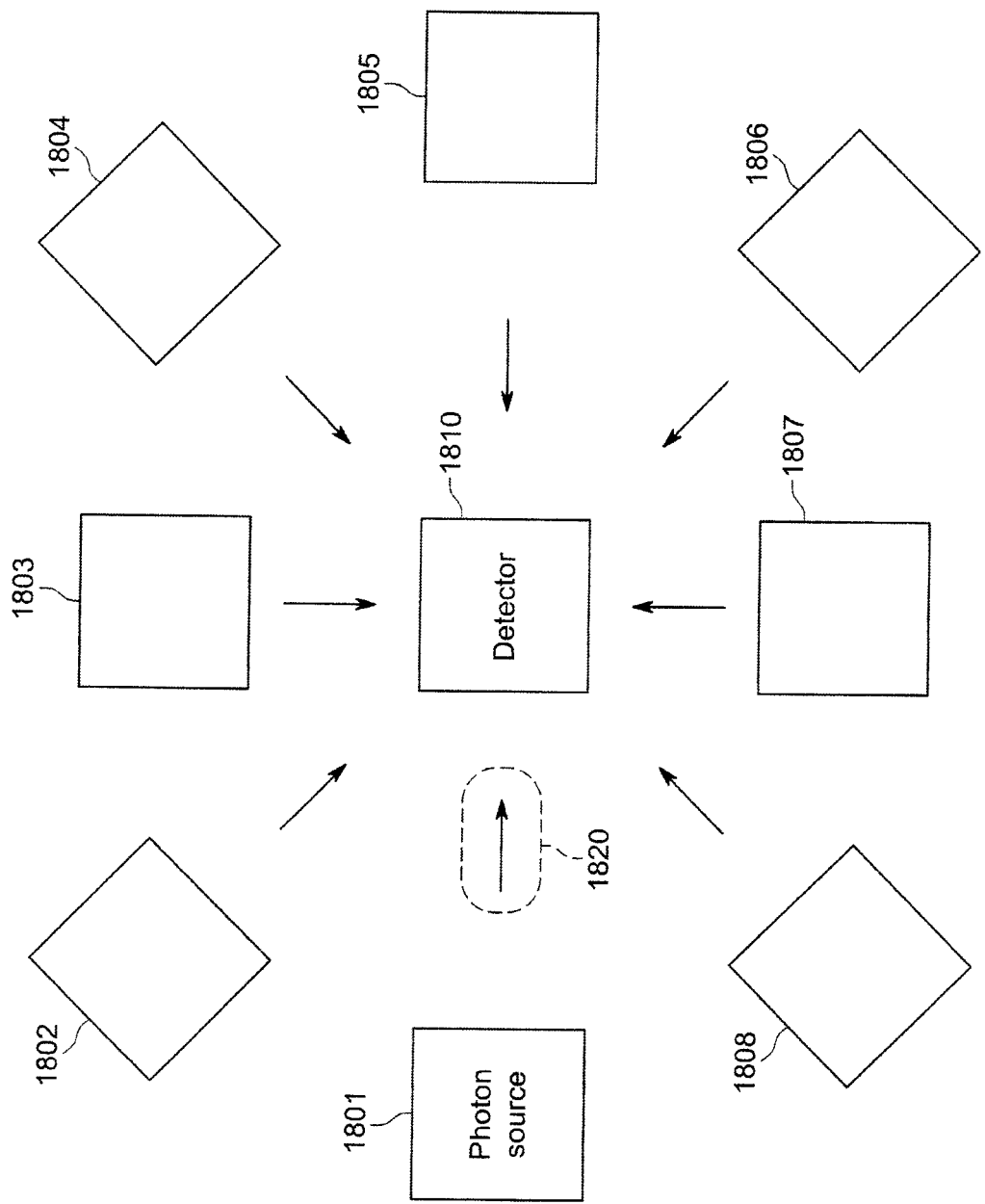
FIG. 18 is a plan view depicting the spectrophotometer comprising eight photonic sources with photonic beams directed into a single detector.

FIG. 18 is a plan view depicting a spectrophotometer comprising eight photon sources 1801-1808 with photonic beams 1820 directed into a single detector 1810. In this embodiment, the micro-platform of each photonic source is configured with a resonant plasmonic filter, providing radiation at unique limited wavelength ranges of interest.

The detector 1810 is sensitive over a broadband of wavelengths matched to the spectrum of radiation from all photonic sources 1801-1808. The photonic sources and photonic detector are disposed on an extended surface providing the shared supporting substrate.

Figure 19A:
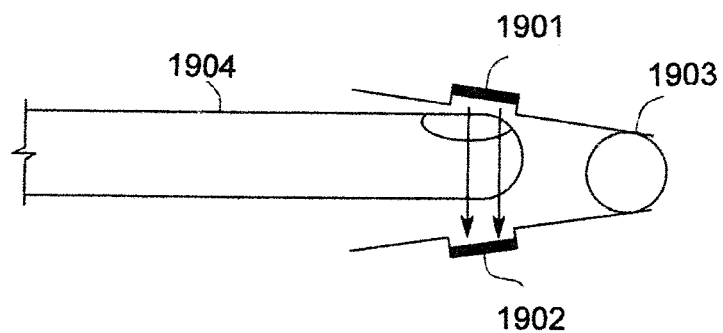
FIG. 19A is a cross-sectional view depicting the spectrophotometer comprising a photonic source and a photonic detector, wherein the fluid of interest is blood in a human finger.

FIG. 19A is a cross-sectional view depicting an embodiment of the spectrophotometer comprising a photonic source 1901 and a photonic detector 1902, with the photonic beam guided through blood in a human finger 1904. The photon source and photon detector are clamped onto an inserted finger with mechanical spring 1903.

Figure 19B:
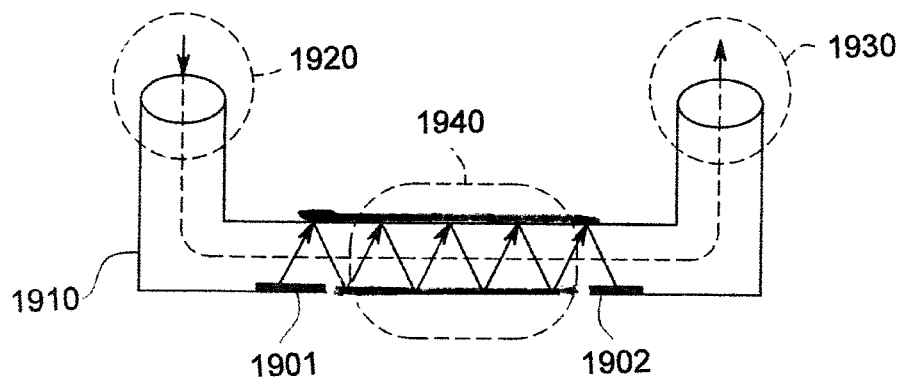
FIG. 19B is a cross-sectional view depicting the spectrophotometer comprising a photonic source and a photonic detector, wherein the fluid of interest is human exhaled breath.

FIG. 19B is a cross-sectional view depicting an embodiment of the spectrophotometer comprising a photonic source 1901 and a photonic detector 1902 wherein the fluid of interest 1940 is human exhaled breath. The human subject breathes into orifice 1920 linked with open orifice 1930. In this embodiment, the photonic source and photonic detector may share the same substrate.

Characterization of the Source and Detector.

Figure 20:
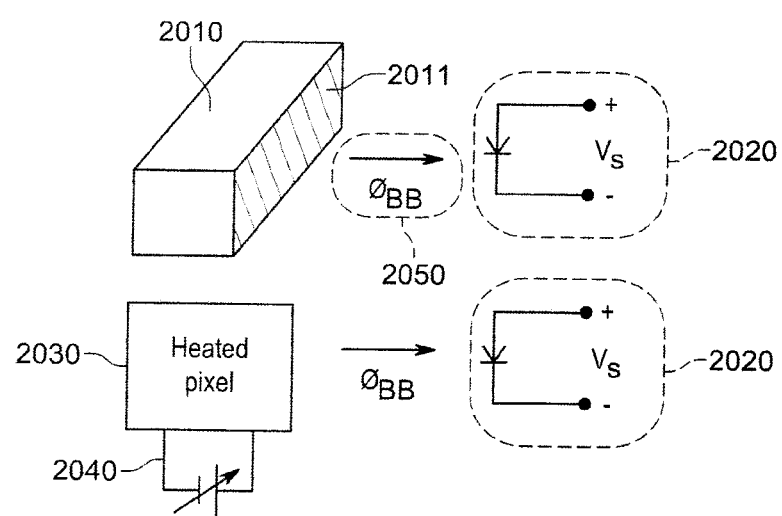
FIG. 20 depicts components for characterizing the photonic source power efficiency and detectivity of the photonic detector.

FIG. 20 depicts components for characterizing the photonic source power efficiency and the photonic detector detectivity parameters.

A calibrated blackbody source 2010 operated near room temperature provides photonic beam $BB 2050 to photonic detector 2020. The detector, with linear response, is calibrated by extrapolating the detector signal level over the detector dynamic range to a noise equivalent power (NEP) level.

Power efficiency of the photonic source 2030, powered from supply 2040, supplies a photonic beam $BB into calibrated photonic detector 2020. In some cases, the photonic detector 2020 is independently calibrated.

Detectivity Enhancement for a Silicon Photonic Detector Micro-Platform.

Figure 21A:
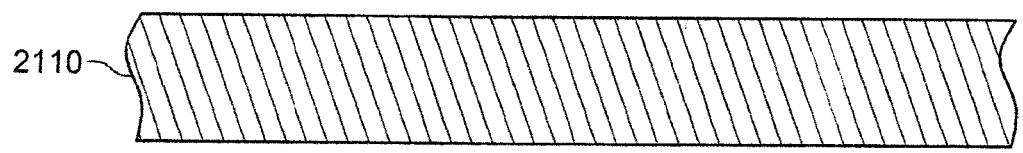
FIGS. 21A and 21B are cross-sectional views depicting a silicon micro-platform before and after growing an oxide layer in a heated atmosphere, respectively.
Figure 21B:
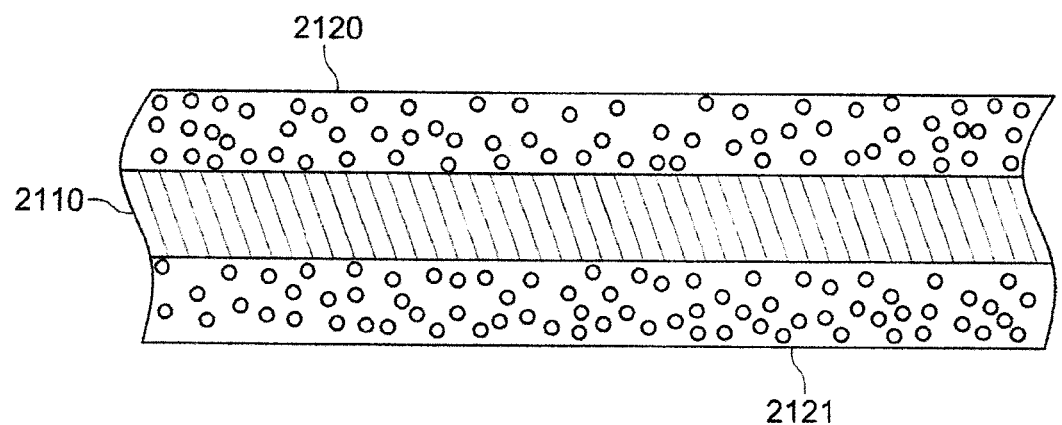

FIGS. 21A, 21B are cross-sectional views depicting nanowire 2110 fabricated from silicon, before and after growing an oxide layer 2120 and 2121 in a heated oxygen atmosphere, respectively.

The oxide grown on the nanowires can significantly increase the mechanical shock resistance and also further reduce the thermal conductivity of the nanowires within a pixel. This oxidation step is performed prior to wafer bonding, and after the release step for the micro-platform and nanowires. In this embodiment, high-temperature metallization is used to withstand the oxidation temperature.

Phononic MEMS Spectrophotometer Applications.

In various embodiments, the fluid of interest may be an atmosphere comprising an exhaust or smokestack effluent, drinking water, breath, blood, urine, a liquid or gaseous product from a chemical reaction, among other fluids. In some embodiments, multiple wavelength bands attenuated in the fluid of interest are monitored to increase the confidence level for a single component within the fluid of interest. In some embodiments, one or more photonic sources provide separate wavelengths for monitoring separate components within the fluid of interest.

Photonic beams and detection with limited bandwidth range is enhanced with metamaterial plasmonic filters disposed in the micro-platform of either or both the photonic source and detector.

In some embodiments, the spectrophotometer is implanted inside a living body, so that tissue components may be monitored or identified.

In some embodiments, the fluid of interest comprises one or more of the following chemical species: $O_2$, $H_2O$, $H_2O_2$, $CH_4$, $BBr_3$, $C_2H_6$, $C_2H_2$, $HBr$, $CO$, $CO_2$, $NH_3$, $NO$, $NO_2$, $C_2H_5OH$, and $CH_2O$, among any others.

In some embodiments in which the spectrophotometer functions as a gas monitor for exhaust fumes or smokestack effluent, the fluid of interest may include reflective particulates, such as dust and sand. The spectrometer can be calibrated for sensing such particulates to provide applications such as a smoke alarm.

In some embodiments, the spectrophotometer is configured for operation as an oximeter that is sensitive to the oxygen content of blood. The embodiment depicted in FIG. 19A can be used for a pulsed oximeter. In some embodiments, the spectrometer monitors multiple wavelengths, including a first reference wavelength and second wavelength specifically absorbed by blood oxygen.

In some embodiments, the spectrophotometer is configured to monitor the glucose content of blood. In such embodiments, the spectrophotometer may monitor a first reference wavelength, in addition to separate multiple wavelength bands wherein glucose in blood specifically attenuates the photonic beam to the detector.

In some applications, usefulness and cost effectiveness is enhanced by powering a compact embodiment of the spectrophotometer with a miniature battery. The photonic source and detector configurations disclosed herein support compact spectrophotometer implementations.

While the invention has been described in detail by specific reference to certain embodiments, it is understood that variations and modifications may be made without departing from the true spirit and scope of the invention. It is to be understood that although the disclosure teaches many examples of embodiments in accordance with the present teachings, any additional variations of the invention can easily be devised by those skilled in the art after reading this disclosure. As a consequence, the scope of the present invention is to be determined by the following claims.

What is claimed:

1. A phononic MEMS spectrophotometer (PMS) comprising:
   a first substrate;
   a photonic source formed on a first region of the first substrate, wherein the first region defines a first micro-platform that is supported, from a first surrounding region of the first substrate, by a first plurality of nanowires having phononic structural elements;
   a photonic detector formed on a second region of the first substrate, wherein the second region defines a second micro-platform that is supported, from a second surrounding region of the first substrate, by a second plurality of nanowires having phononic elements; and
   wherein the photonic source and photonic detector are configured and arranged so that a first portion of a photonic beam emitted from the photonic source and directed through a fluid of interest is received by the photonic detector.

2. The PMS of claim 1 wherein the photonic source provides a photonic beam having spectral components within the range of visible light and long-wavelength infrared radiation.

3. The PMS of claim 1 wherein the first substrate is an active silicon layer of a silicon-on-insulator wafer.

4. The PMS of claim 3 wherein a first mirror is disposed on a substrate layer of the silicon-on-insulator wafer, and wherein a second portion of the photonic beam emitted from the photonic source passes through the first micro-platform, and further wherein the first mirror is positioned to reflect the second portion of the photonic beam back to the first micro-platform.

5. The PMS of claim 4 wherein a second mirror is disposed on the substrate layer of the silicon-on-insulator wafer, wherein the second mirror is positioned to reflect a portion of the first photonic beam received by the photonic detector and passing through the second micro-platform back to the second micro-platform.

6. The PMS of claim 3 wherein a first mirror is disposed on a substrate layer of the silicon-on-insulator wafer, wherein the first mirror is positioned to reflect a portion of the first photonic beam received by the photonic detector and passing through the second micro-platform back to the second micro-platform.

7. The PMS of claim 1 wherein at least one of the first micro-platform and the second micro-platform comprise at least one of carbon nanotubes, graphene, silicon black, carbon black, and gold black.

8. The PMS of claim 1 wherein the first micro-platform and the second micro-platform comprise resonant metamaterial structures.

9. The PMS of claim 1 wherein the first plurality of nanowires and the second plurality of nanowires comprise at least one layer of crystalline or polycrystalline semiconductor material.

10. The PMS of claim 9 wherein the at least one layer of crystalline or polycrystalline semiconductor material is selected from the group consisting of silicon, silicon germanium, germanium, silicon carbide, gallium nitride, vanadium oxide, and complex thermoelectric semiconductor.

11. The PMS of claim 1 wherein the first plurality of nanowires and the second plurality of nanowires comprise a dielectric film.

12. The PMS of claim 11 wherein the dielectric film is selected from the group consisting of silicon dioxide, aluminum oxide, and silicon nitride.

13. The PMS of claim 1 wherein the phononic structural elements comprise one or more of holes, vias, pillars, surface dots, plugs, cavities, indentations, surface particulates, roughened edges, implanted molecular species, molecular aggregates, and porous structure.

14. The PMS of claim 1 comprising a first plurality of micro-platforms including the first micro-platform, each of the micro-platforms of the first plurality including a photonic source, wherein the first plurality of micro-platforms are electrically interconnected to one another and are each supported by a first plurality of nanowires having phononic structural elements.

15. The PMS of claim 1 comprising a first plurality of micro-platforms including second micro-platform, each of the micro-platforms of the first plurality including a photonic detector, wherein the first plurality of micro-platforms are electrically interconnected to one another and are each supported by a first plurality of nanowires having phononic structural elements.

16. The PMS of claim 1 comprising a controller circuit, wherein the controller circuit controls an intensity level of the photonic source.

17. The PMS of claim 1 comprising a signal analyzer, wherein the signal analyzer provides at least one of monitoring and identification of at least one component in the fluid of interest.

18. The PMS of claim 1 comprising synchronous detection circuitry, wherein the synchronous detection circuitry separates a signal resulting from a bolometer interrogation current from a signal that results from a signal that results from the photonic beam received by the photonic detector.

19. The PMS of claim 1 comprising a mirror, wherein, after being directed through the fluid of interest, the first portion of a photonic beam emitted from the photonic source is reflected from the mirror towards the photonic detector.

20. A method of making a phononic MEMS spectrophotometer comprising:
   forming, in an active silicon layer of a silicon-on-insulator wafer:
   (a) a first micro-platform and at least a first nanowire and a second nanowire, wherein the first and second nanowires physically support and isolate the first micro-platform from a first surrounding region of the active silicon layer;
   (b) a second micro-platform and at least a third nanowire and a fourth nanowire, wherein the third and fourth nanowires physically support and isolate the second micro-platform from a second surrounding region of the active silicon layer;
   (c) a photonic source on the first micro-platform;
   (d) a photonic detector on the second micro-platform;
   (e) a first hermetic seal that encapsulates the first micro-platform and the photonic source; and
   (f) a second hermetic seal that encapsulates the second micro-platform and the photonic detector.

21. A method of using a phononic MEMS spectrophotometer for performing at least one of monitoring and identification of a component within a fluid of interest, the method comprising:
   directing, from a photonic source disposed on a first micro-platform formed in a first silicon layer of the phononic MEMS spectrophotometer, a photonic beam towards and through the fluid of interest;
   receiving, at a photonic detector disposed on a second micro-platform formed in the first silicon layer of the phononic MEMS spectrophotometer, the photonic beam after the photonic beam pass through the fluid of interest.

<p style="text-align:center">* * * * *</p>